United States Patent
Choi (10) Patent No.: US 8,894,935 B2
(45) Date of Patent: Nov. 25, 2014

(54) MONITORING SYSTEM FOR SELECTIVE CATALYST REDUCTION SYSTEM

(75) Inventor: Chang Eun Choi, Gunpo (KR)

(73) Assignee: Hyundai Motor Company, Seoul (KR)

( * ) Notice: Subject to any disclaimer, the term of this patent is extended or adjusted under 35 U.S.C. 154(b) by 1036 days.

(21) Appl. No.: 12/193,461

(22) Filed: Aug. 18, 2008

(65) Prior Publication Data

US 2009/0155130 A1 Jun. 18, 2009

(30) Foreign Application Priority Data

Dec. 14, 2007 (KR) .................. 10-2007-0131630

(51) Int. Cl.
*F01N 11/00* (2006.01)
*F01N 3/20* (2006.01)

(52) U.S. Cl.
CPC ............. *F01N 3/208* (2013.01); *F01N 2240/20* (2013.01); *F01N 2560/026* (2013.01); *F01N 2560/14* (2013.01); *F01N 2610/02* (2013.01); *F01N 2610/146* (2013.01); *F01N 2900/08* (2013.01); *Y02T 10/24* (2013.01)
USPC .................. 422/111; 60/295; 60/301; 422/62

(58) Field of Classification Search
CPC .................................................... F01N 3/208
USPC .................. 422/111, 93, 62; 60/295, 301; 73/114.75, 114.71; 436/37
See application file for complete search history.

(56) References Cited

U.S. PATENT DOCUMENTS

| | | | |
|---|---|---|---|
| 5,941,918 A * | 8/1999 | Blosser ........................... | 701/29 |
| 6,269,633 B1 * | 8/2001 | van Nieuwstadt et al. ..... | 60/277 |
| 6,311,480 B1 * | 11/2001 | Suzuki et al. .................. | 60/277 |
| 6,347,513 B2 * | 2/2002 | Pfleger et al. .................. | 60/277 |
| 6,928,806 B2 | 8/2005 | Tennison et al. | |
| 7,204,081 B2 * | 4/2007 | Yasui et al. .................... | 60/286 |
| 7,854,161 B2 * | 12/2010 | Hjorsberg et al. ......... | 73/114.75 |

FOREIGN PATENT DOCUMENTS

| | | |
|---|---|---|
| DE | 19944009 A1 | 3/2001 |
| DE | 102005059549 A1 | 7/2006 |
| JP | 2006-009608 * | 1/2006 |
| JP | 2006009608 A | 1/2006 |
| JP | 2007-100510 | 4/2007 |

OTHER PUBLICATIONS

Machine translation of JP 2006-009608, 11 pages.*

* cited by examiner

*Primary Examiner* — Jill Warden
*Assistant Examiner* — Joye L Woodard
(74) *Attorney, Agent, or Firm* — Morgan, Lewis & Bockius LLP (57) ABSTRACT

A monitoring system for a selective catalyst reduction system according to the present invention includes a selective catalyst reduction system that reacts with ammonia and reduces NOx, a first NOx sensor that is disposed upstream of the selective catalyst reduction system and measures the amount of the NOx that flows into the selective catalyst reduction system, a second NOx sensor that is disposed downstream of the selective catalyst reduction system and measures the amount of the NOx that is reduced, an injector that is disposed between the first NOx sensor and the selective catalyst reduction system and injects a urea solution, and a control portion that calculates reduction efficiency based on signals that are detected from the first NOx sensor and the second NOx sensor, determines the necessary amount of the ammonia according to the reduction efficiency, and controls the injection amount of the urea solution through the injector. The first and second NOx sensors are mean value sensors having a permissible deviation of ±6.7%.

8 Claims, 8 Drawing Sheets

(a) Slope offset (b) Drift offset

FIG.6
PRIOR-ART

FIG.7
PRIOR-ART

FIG.8
PRIOR-ART

MONITORING SYSTEM FOR SELECTIVE CATALYST REDUCTION SYSTEM

CROSS-REFERENCE TO RELATED APPLICATION

This application claims priority to and the benefit of Korean Patent Application No. 10-2007-0131630, filed in the Korean Intellectual Property Office on Dec. 14, 2007, the entire contents of which are incorporated herein by reference.

BACKGROUND OF THE INVENTION (a) Field of the Invention

The present invention relates to a selective catalyst reduction system that is disposed in an exhaust system of a diesel vehicle, and more particularly to a monitoring system for a selective catalyst reduction system that satisfies the reinforced OBD regulations of North America and Europe.

(b) Description of the Related Art

OBD (on board diagnostics) regulations demand improvements in diagnostic ability for detecting malfunctions and degradation of components as well as exhaust gas quality. Further, the OBD demands for satisfying a variety of provisions that are related to the standardization in the A/S (after service) market.

Exhaust gas that is exhausted out of an engine passes through a catalyst reduction system that is disposed in the middle of an exhaust pipe and is purified therein, and the noise thereof is reduced while passing through a muffler and is then expelled to the atmosphere.

The selective catalyst reduction system (SCR) is applied so as to satisfy the reinforced exhaust gas regulations of a diesel vehicle.

The selective catalyst reduction system uses ammonia NH3 as a reducing agent so as to purify NOx that is exhausted out of the diesel vehicle in a large quantity. The ammonia has a good selectiveness to the NOx, and even though oxygen exists, the ammonia reacts with well the NOx.

A chemical reaction of the NOx with ammonia NH3 is as follows, wherein the NH3 resolves the NOx into N2 and H2O.

NOx+NH3(ammonia)→N2+H2O      [Reaction Formula 1]

A urea solution is injected upstream of the selective catalyst reduction system and the ammonia is created through vaporization.

A NOx sensor is provided in the selective catalyst reduction system, and the reduction efficiency of the NOx is changed based on the NOx amount that is measured through the NOx sensor through feedback control in which injection amount of the urea solution is determined.

The NOx sensor not only enhances the reduction efficiency of the NOx, but is also used to monitor the selective catalyst reduction system.

The injection amount of the urea solution may be determined and the SCR system may be monitored based on a NOx map instead of the NOx sensor. However, the precision of the NOx map decreases in a quick acceleration or quick deceleration condition, so it is difficult to satisfy the exhaust gas regulations.

The NOx reduction efficiency ($\eta$) of the selective catalyst reduction system is defined as in the following Equation 1.

$$\eta = 1 - y/x \quad \text{(Equation 1)}$$

In Equation 1, x is the NOx amount that is measured upstream of the selective catalyst reduction system, and y is the NOx amount that is measured downstream of the same.

Also, the NOx amount that is not purified in the selective catalyst reduction system, that is, the slip rate ($\theta$) of the NOx, is defined as in the following Equation 2.

$$\theta = 1 - \eta \quad \text{(Equation 2)}$$

Figure 5:
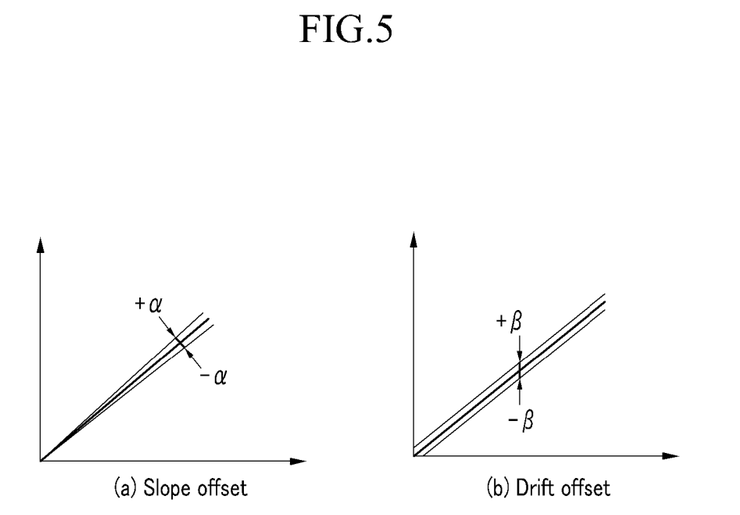
FIG. 5 shows a kind of deviation of a NOx sensor that is disposed in a general selective catalyst reduction system.

Also, a deviation error of the NOx sensor disposed in the selective catalyst reduction system includes a slope offset that has a value of $\pm\alpha$ as shown in (a) of FIG. 5 and a drift offset that has a value of $\pm\beta$ as shown in (b) FIG. 5, and these are defined as in the following Equation 3 and Equation 4.

$$x = (1\pm\alpha) \times x_o \pm \beta \quad \text{(Equation 3)}$$

$$y = (1\pm\alpha) \times y_o \pm \beta \quad \text{(Equation 4)}$$

In Equation 3 and Equation 4, $x_o$ represents the NOx amount that is detected upstream of the selective catalyst reduction system, $y_o$ represents the NOx amount that is detected downstream of the selective catalyst reduction system, "$\alpha$" represents the slope offset of the NOx sensor, and "$\beta$" represents the drift offset of the NOx sensor.

Also, when the NOx sensors are disposed upstream and downstream of the selective catalyst reduction system, the NOx amount that is measured through the NOx sensor that is disposed in the rear is defined as in the following Equation 5 through Equation 2 to Equation 4.

$$y = (1\pm\alpha) \times \theta \{(1\pm\alpha) \times x_o \pm \beta\} \pm \beta \quad \text{(Equation 5)}$$

For example, $y_{nor}$ is the NOx amount that is measured downstream of the normal selective catalyst reduction system, $y_{thr}$ is the threshold value of the NOx amount, and a difference $\Delta y$ between the two values is defined as in the following Equation 6.

$$\Delta y = y_{thr} - y_{nor} > 0 \quad \text{(Equation 6)}$$

In the worst condition in which the difference between the above two values is minimized, $y_{nor}$ has to have a maximum value and $y_{thr}$ has to have a minimum value, and these conditions are defined as in the following Equation 7 and Equation 8.

$$y_{nor} = (1+\alpha) \times \theta_{nor} \{(1+\alpha) \times x_o + \beta\} + \beta \quad \text{(Equation 7)}$$

$$y_{thr} = (1-\alpha) \times \theta_{thr} \{(1-\alpha) \times x_o - \beta\} - \beta \quad \text{(Equation 8)}$$

Equation 7 and Equation 8 are calculated into the following Equation 9.

$$\Delta y_{2sensors} = \{(1-\alpha)^2 \theta_{thr} - (1+\alpha)^2 \theta_{nor}\} x_o - \{(1-\alpha)\theta_{thr} + (1+\alpha)\theta_{nor}\}\beta - 2\beta > 0 \quad \text{(Equation 9)}$$

Generally, the exhausted NOx amount is regulated to under 0.05 g/mile based on the regulations of North America (Tier2 Bin5), and it demands that the raw emission of the engine is to be under 0.3 g/mile so as to satisfy the regulation.

Accordingly, the reduction efficiency of the selective catalyst reduction system has to be at least 83.33%.

Also, in 2013, the regulation value will change to under 0.0875 g/mile, which is 1.75 times the threshold of the OBD II, such that the reduction efficiency of the selective catalyst reduction system has to become at least 70.83%.

If it is assumed that there is no slip of the ammonia NH3 in the selective catalyst reduction system, the EURO 6 regulation value, the OBD regulation value, the reduction efficiency ($\eta$) of NOx, the slip rate ($\theta$) of NOx and so on are as in the following Table 1.

TABLE 1

| Item | | OBD regulation value | North American regulation value (g/mile) 0.05 | EURO6 (g/km) 0.08 | Remarks NOx regulation value |
|---|---|---|---|---|---|
| 2010-2012 | | 2.5 times | 0.1250 | — | — |
| 2013 - | | 1.75 times | 0.0875 | — | — |
| 2014 - | | 1.75 times | — | 0.140 | — |
| Engine output | | — | 0.30 | 0.186 | Engines are same |
| Efficiency of normal SCR | $\eta_{nor}$ | — | 0.8333 | 0.5709 | — |
| NOx slip rate of normal SCR | $\theta_{nor}$ | — | 0.1667 | 0.4291 | — |
| Threshold efficiency | $\eta_{nor}^{2.5}$ | 2.5 times | 0.5833 | — | — |
| Threshold NOx slip rate of normal SCR | $\theta_{nor}^{2.5}$ | | 0.4167 | — | — |
| Threshold efficiency of normal SCR | $\theta_{nor}^{1.75}$ | 1.75 times | 0.7083 | 0.2490 | — |
| Threshold of NOx slip rate of SCR | $\theta_{nor}^{1.75}$ | | 0.2917 | 0.7510 | — |

The NOx amount of raw emission in the North America engine is assumed to be 100 ppm so as to analyze the result.

In the North America engine, the measured NOx amount is 50 ppm on average upstream of the selective catalyst reduction system, and the measured NOx amount is 12 ppm downstream of the selective catalyst reduction system.

2.5 times the threshold of the North America OBD II is to be satisfied until 2012 so as to monitor the selective catalyst reduction system in a case in which two NOx sensors are disposed.

Figure 6:
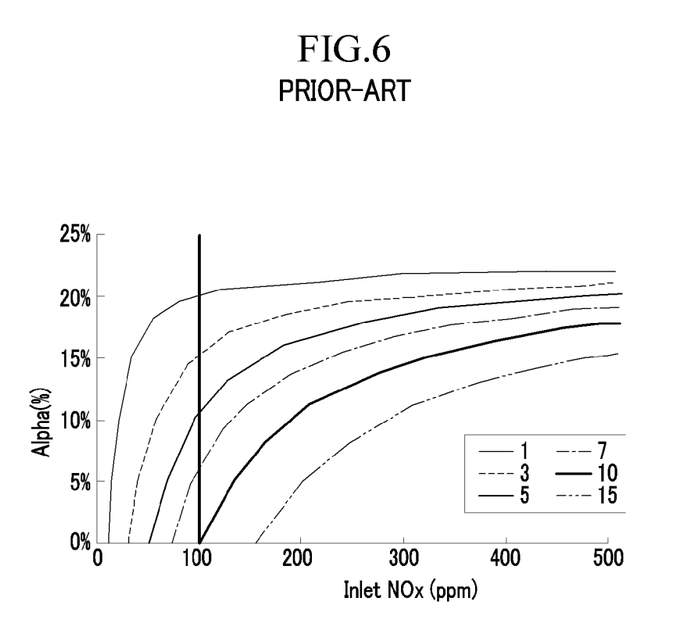
FIG. 6 to FIG. 8 show deviations of monitoring results in a conventional selective catalyst reduction system.

Accordingly, $\Delta y_{2sensors}$ in Equation 9 is shown in FIG. 6.

When the NOx amount in the inlet of the selective catalyst reduction system is 100 ppm as a criterion value, the permissible drift offset ($\beta$) of the NOx sensor can be 5% in a case in which the slope offset ($\alpha$) of the NOx sensor is 10%, and the permissible drift offset ($\eta$) of the NOx sensor can be 1% in a case in which the slope offset ($\alpha$) is 20%.

Accordingly, when the precision of the NOx sensor is very high, it is possible to monitor the selective catalyst reduction system in accordance with the OBD II regulations.

The NOx sensor that is manufactured by Siemens does not have a slope offset, and only has ±10% drift offset in a fresh condition (not used) and ±20% drift offset in an aged condition (used).

Accordingly, the permissible limit of the drift offset is 9.7% in a case in which the slope offset is zero, so a new NOx sensor that has a drift sensor error of ±10% can properly monitor the selective catalyst reduction system, but an old NOx sensor that has a drift sensor error of ±20% cannot properly monitor the selective catalyst reduction system.

Figure 7:
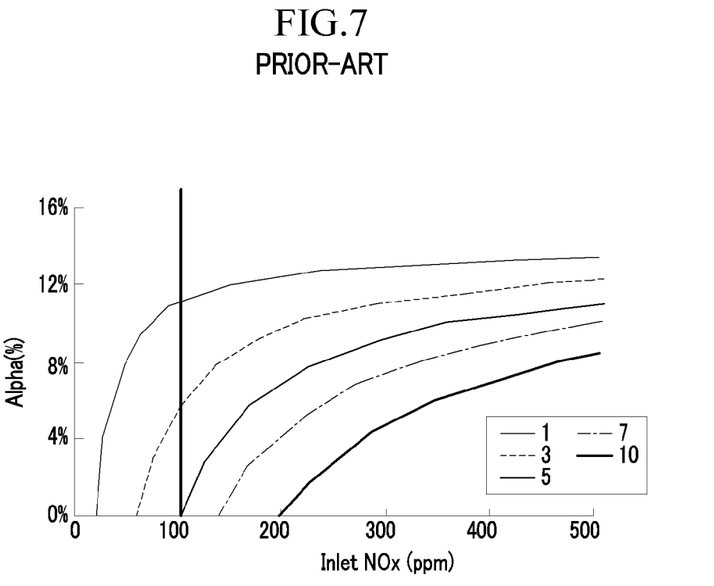

Also, in 2013, the regulation value will change to 1.75 times the threshold of the North America OBD II, and the $\Delta y_{2sensors}$ value in Equation 9 is shown as in FIG. 7.

In FIG. 7, when the NOx amount of the inlet side of the selective catalyst reduction system is 100 ppm and the slope offset does not exist, the permissible limit of the drift offset of the NOx sensor is only 5.1%.

Accordingly, in this case there is a problem that the new NOx sensor cannot monitor the selective catalyst reduction system.

Figure 8:
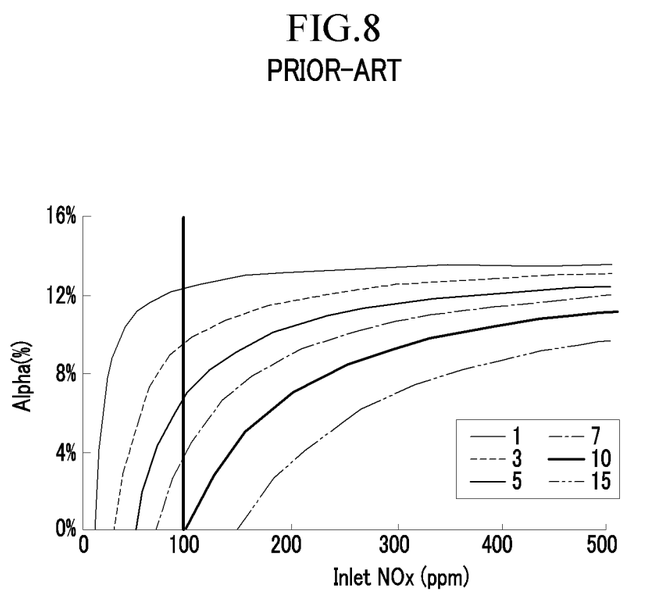

Also, as 1.75 times the threshold of the OBD of the EURO 6 is to be satisfied as of 2014, the $\Delta y_{2sensors}$ in the Equation 9 is shown as in FIG. 8.

The NOx regulation of the EURO 6 is looser than the North America Tier2 Bin5, so the permissible limit of the drift offset of the NOx sensor is 10.2 ppm as shown in FIG. 8.

However, the present NOx sensor cannot monitor the selective catalyst reduction system to the level of the regulation of North America.

The above explanation is arranged as in the following Table 2, and the present NOx sensor cannot monitor the selective catalyst reduction system as shown in Table 2 against the OBD regulations of North America and Europe.

TABLE 2

| Item | North America | | Europe | Remarks |
|---|---|---|---|---|
| OBD II regulation | 2.5X (from 2012) | 1.75X (from 2013) | 1.75X (from 2014) | OBD regulation |
| NOx sensor | impossible | impossible | impossible | The new NOx sensor is possible, but impossible in a real condition |

That is, when the degradation of the NOx sensor is considered, the present NOx sensor cannot satisfy the OBD regulation of North America and Europe.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a selective catalytic reduction system having advantages of satisfying the reinforced OBD regulations of North America and Europe by disposing a mean value sensor upstream and downstream of a selective catalyst reduction system.

A selective catalyst reduction system according to the present invention includes a selective catalyst reduction system that reacts with ammonia and reduces NOx, a first NOx sensor that is disposed upstream of the selective catalyst reduction system and measures the amount of NOx that flows into the selective catalyst reduction system, a second NOx sensor that is disposed downstream of the selective catalyst reduction system and measures the amount of the NOx that is reduced, an injector that is disposed between the first NOx sensor and the selective catalyst reduction system and injects a urea solution, and a control portion that calculates reduction efficiency based on signals that are detected from the first NOx sensor and the second NOx sensor, applies the calculated reduction efficiency to engine speed and fuel amount conditions, determines the necessary amount of ammonia according to the reduction efficiency, and controls the injection amount of the urea solution through the injector.

The present invention offers monitoring for satisfying the reinforced OBD regulations of North America and Europe by disposing a mean value sensor upstream and downstream of a selective catalyst reduction system.

Also, the reduction efficiency of the NOx is improved by a reliable monitoring result and optimal injection of the urea solution.

DETAILED DESCRIPTION OF THE EMBODIMENTS

In the following detailed description, only certain exemplary embodiments of the present invention have been shown and described, simply by way of illustration.

As those skilled in the art would realize, the described embodiments may be modified in various different ways, all without departing from the spirit or scope of the present invention, and the drawings and description are to be regarded as illustrative in nature and not restrictive.

Figure 1:
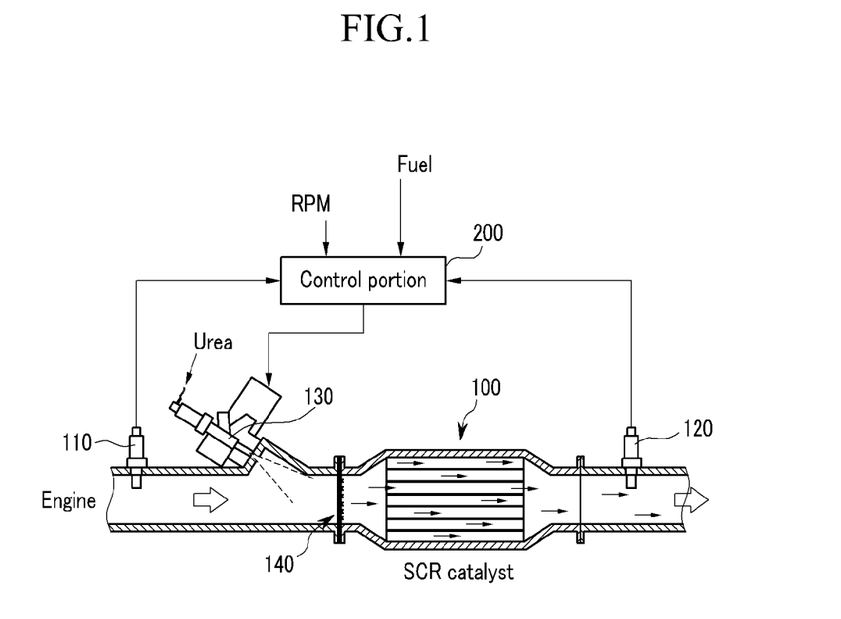
FIG. 1 shows a monitoring device of a selective catalyst reduction system according to an exemplary embodiment of the present invention.

FIG. 1 shows a selective catalyst reduction system according to an exemplary embodiment of the present invention.

As shown, a first NOx sensor 110 is disposed upstream of a selective catalyst reduction apparatus 100, and a second NOx sensor 120 is disposed downstream of the selective catalyst reduction apparatus 100.

Generally, NOx sensors are classified as a mean value sensor for detecting a mean value among the NOx signals detected, a maximum value sensor for detecting a maximum value, and a minimum value sensor for detecting a minimum value.

In the present exemplary embodiment, one of the first NOx sensor 110 and the second NOx sensor 120 that are respectively disposed upstream and downstream of the selective catalyst reduction apparatus 100 is a mean value sensor.

The NOx sensor that is disposed downstream where the NOx amount is less than upstream of the selective catalyst reduction apparatus 100 is the mean value NOx sensor, and thereby the monitoring possibility can be enhanced.

Also, when the first NOx sensor 110 and the second NOx sensor 120 that are respectively disposed upstream and downstream of the selective catalyst reduction system apparatus 100 are both mean value NOx sensors, the monitoring efficiency is enhanced.

This will be explained as follows.

For a convenient calculation, on the supposition that the mean value NOx sensor has no error rate, a permissible aberration is calculated independently.

In this instance, Equation 5 is arranged as the following Equation 10 and Equation 11.

$$y = \theta_x = \theta\{(1 \pm \alpha) \times x_o \pm \beta\}$$

$$y_{nor} = \theta_{nor}\{(1+\alpha) \times x_o + \beta\}$$

$$y_{thr} = \theta_{thr}\{(1-\alpha) \times x_o - \beta\} \qquad \text{(Equation 10)}$$

Equation 10 is arranged as the following Equation 11.

$$\Delta y_{rear\_Mean} = \{(1-\alpha)\theta_{thr} - (1+\alpha)\theta_{nor}\}x_o - \{\theta_{thr} + \theta_{nor}\}\beta > 0$$

An injector 130 that injects a urea solution is disposed between the first NOx sensor 110 and the selective catalyst reduction apparatus 100.

A control portion 200 detects the NOx amount that is included in the exhaust gas that is sensed in the first NOx sensor 110 and the second NOx sensor 120.

Accordingly, the control portion 200 monitors the NOx amount that is detected by the first NOx sensor 110 and the second NOx sensor 120, analyzes the reduction efficiency of the selective catalyst reduction apparatus 100, applies the reduction efficiency to the engine speed and fuel amount conditions, and determines the necessary ammonia amount.

Further, the control portion 200 determines the final urea solution amount by applying an ammonia conversion coefficient (0.1955) of the urea solution according to the necessary ammonia amount.

Then, the control portion 200 uses PWM (pulse width modulation) duty or an on/off pulse signal so as to have the injector 130 inject the determined amount of urea solution.

The urea solution that is injected through the injector 130 mixes with the exhaust gas in a mixer 140 and is divided into H2O and ammonia (NH3) through vaporization, and the ammonia oxidizes or deoxidizes with the NOx to purify the NOx.

As described above, the first NOx sensor 110 or the second NOx sensor 120 that is disposed upstream or downstream of the selective catalyst reduction apparatus 100 is the mean value sensor, so the North American OBD II regulation can be monitored until 2012.

Figure 2:
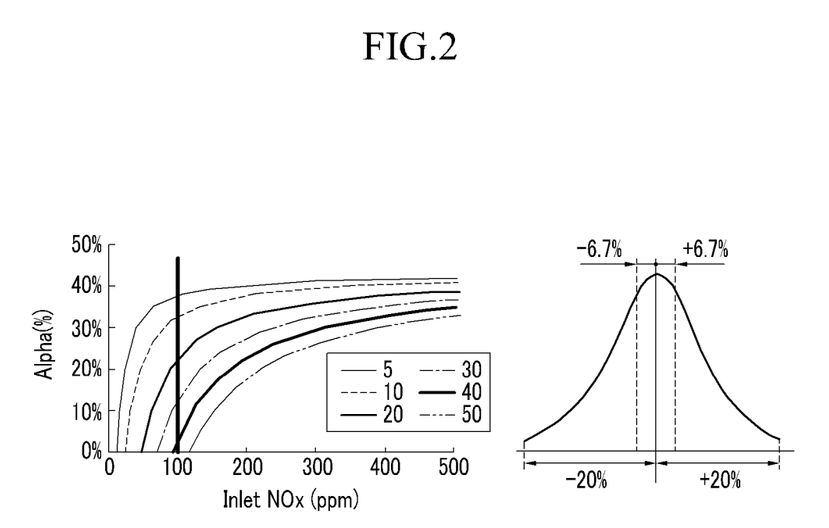
FIG. 2 to FIG. 4 show monitoring results in which a mean value NOx sensor is applied to a selective catalyst reduction system according to an exemplary embodiment of the present invention.

The regulation value of the North America OBD II until 2012 is as shown FIG. 2 and is analyzed through Equation 11.

In the FIG. 2, when the NOx amount of the inlet of the selective catalyst reduction apparatus 100 is 100 ppm and the slope offset of the NOx sensor is zero, the permissible drift offset is 43%.

When considering that the permissible limit of the degraded NOx sensor is ±20%, a drift offset of ±43% may be monitored.

However, it is impossible to dispose an errorless NOx sensor downstream of the selective catalyst reduction apparatus, so the range of the mean value sensor that is possible to monitor is ±6.7%, which satisfies the permissible limit of ±20%.

To sum up, although a sensor is disposed upstream of the selective catalyst reduction apparatus, it is possible to monitor the North America OBD II until 2012 by disposing the mean value sensor that has an error range of ±6.7% downstream of the selective catalyst reduction apparatus.

Figure 3:
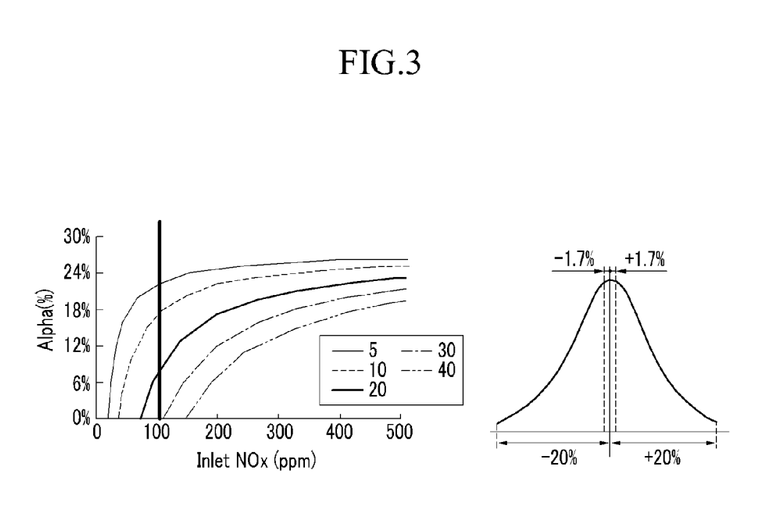

The regulation value of the North America OBD II from 2013 is as shown in FIG. 3, and is analyzed through Equation 11.

In the FIG. 3, when the NOx amount of the inlet of the selective catalyst reduction apparatus 100 is 100 ppm, the permissible drift offset is 27.4% in a case in which the slope offset of the NOx sensor is 0.

The range of the mean value NOx sensor can be calculated to ±1.7% that is possible to monitor, and satisfies ±20% that is the permissible limit of the NOx sensor.

Accordingly, it is possible to monitor the selective catalyst reduction apparatus against the North America OBD II regulation value from 2013 by disposing the mean value NOx sensor that has an offset amount within ±1.7% downstream of the catalyst reduction apparatus.

Figure 4:
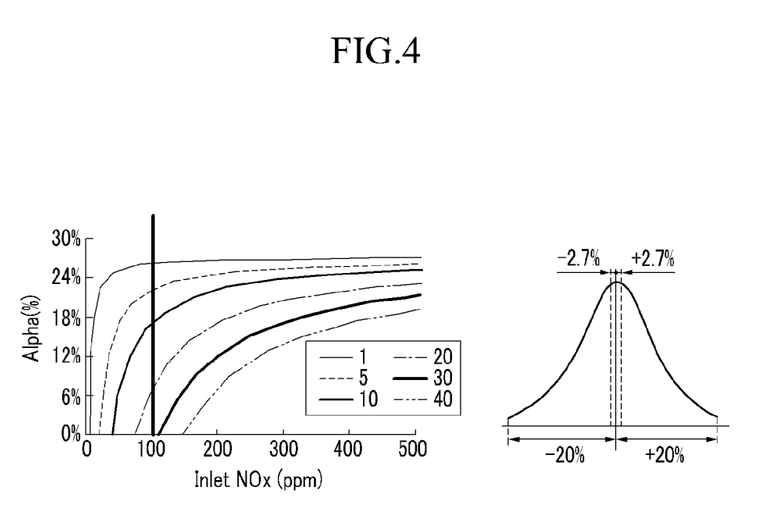

Also, the regulation value of the EURO 6 OBD II from 2014 is as shown in FIG. 4 and is analyzed through Equation 11.

In FIG. 4, when the NOx amount of the inlet of the selective catalyst reduction apparatus 100 is 100 ppm, the permissible drift offset is 27.4% in a case in which the slope offset of the NOx sensor is 0.

This is the permissible limit that is equal to the threshold of the North America OBD II that is applied from 2013.

However, the range of the mean value NOx sensor is ±2.7% that satisfies the permissible limit of ±20% and is possible to monitor.

This is because the regulation value of the EURO 6 OBD II is loose.

Accordingly, it is possible to monitor the selective catalyst reduction apparatus so as to satisfy the regulation value of the EURO 6 OBD II from 2014 by disposing the mean value NOx sensor that has the offset amount within ±2.7% downstream of the catalyst reduction apparatus.

As described above, considering the OBD II regulation value of North America and Europe with respect to the selective catalyst reduction system, the disposition of the NOx sensor can be arranged as in the following Table 3 and Table 4.

It is more efficient to dispose the mean value NOx sensor downstream of the selective catalyst reduction apparatus 100 than upstream thereof.

TABLE 3

| Item | North America | Europe | | Remarks |
|---|---|---|---|---|
| OBD II regulation value | 2.5 times -2012 ±6.7 | 1.75 times (2013-) ±1.7 | 1.75 times 2014- ±2.7 | degradation ± 20%, 0Km ± 10% |
| Permissible NOx sensor deviation | ±8.1 | ±2.8 | ±7.2 | degradation ± 15%, 0Km ± 7% |

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A selective catalyst reduction system, comprising:
   a selective catalyst reduction apparatus that reacts with ammonia and reduces NOx;
   a first NOx sensor that is disposed upstream of the selective catalyst reduction apparatus and measures the amount of the NOx that flows into the selective catalyst reduction apparatus;
   a second NOx sensor that is disposed downstream of the selective catalyst reduction apparatus and measures the reduced amount of the NOx that flows out of the selective catalyst reduction apparatus;
   an injector that is disposed between the first NOx sensor and the selective catalyst reduction apparatus and injects a urea solution; and
   a control portion that calculates reduction efficiency based on NOx signals detected from the first NOx sensor and the second NOx sensor, determines the necessary amount of ammonia according to the reduction efficiency, and controls the determined injection amount of the urea solution through the injector;
   wherein the first NOx sensor and the second NOx sensor are mean value sensors respectively detecting a mean value of the NOx signals, wherein the difference between the amount of NOx measured by said second NOx sensor and a threshold amount of NOx for said system is calculated according to the following formula:

$$\Delta y_{rear\_Mean} = \{(1-\alpha)\theta_{thr} - (1+\alpha)\theta_{nor}\}x_o - \{\theta_{thr} + \theta_{nor}\}\beta > 0,$$

in which
   $\alpha$ is the slope offset of the NOx sensor;
   $\beta$ is the drift offset of the NOx sensor;
   $\theta$ is the slip rate of the NOx;
   $x_o$ is the NOx amount that is detected at the first sensor;
   $y_o$: the NOx amount that is detected at the second sensor;
   $y_{nor}$ is the NOx amount that is measured at downstream of the normal selective catalyst reduction system;
   $y_{thr}$ is the threshold value of the NOx amount
   $\theta_{nor}$ is the slip rate of the NOx at normal condition; and
   $\theta_{thr}$ is the slip rate of the NOx at threshold condition,
   wherein a possible deviation of the first and second NOx sensors is within a predetermined range of ±6.7%.

2. The selective catalyst reduction system of claim 1, wherein a mixer is disposed between the injector and the selective catalyst reduction apparatus.

3. The selective catalyst reduction system of claim 1, wherein the control portion applies the calculated reduction efficiency to engine speed and fuel amount conditions to determine the necessary amount of ammonia according to the reduction efficiency.

4. The selective catalyst reduction system of claim 1, wherein a possible deviation of the mean value NOx sensor is within a predetermined range of ±1.7%.

5. The selective catalyst reduction system of claim 1, wherein a possible deviation of the mean value NOx sensor is within a predetermined range of ±2.7%.

6. The selective catalyst reduction system of claim 1, wherein the control portion applies an ammonia conversion coefficient of the urea solution and determines a final amount of the urea solution according to a necessary ammonia amount.

7. The selective catalyst reduction system of claim 1, wherein the control portion uses signals of one of a pulse width modulation (PWM) duty, and on/off pulse controls the injector.

8. A selective catalyst reduction system, comprising:
   a selective catalyst reduction apparatus that reacts with ammonia and reduces NOx;
   a first NOx sensor that is disposed upstream of the selective catalyst reduction apparatus and measures the amount of the NOx that flows into the selective catalyst reduction apparatus;
   a second NOx sensor that is disposed downstream of the selective catalyst reduction apparatus and measures the reduced amount of the NOx that flows out of the selective catalyst reduction apparatus;

an injector that is disposed between the first NOx sensor and the selective catalyst reduction apparatus and injects a urea solution; and a control portion that calculates reduction efficiency based on NOx signals detected from the first NOx sensor and the second NOx sensor, determines the necessary amount of ammonia according to the reduction efficiency, and controls the determined injection amount of the urea solution through the injector;

wherein the first NOx sensor and the second NOx sensor are mean value sensors respectively detecting a mean value of the NOx signals, wherein a possible deviation of the first and second NOx sensors is within a predetermined range of ±6.7%.

* * * * *